United States Patent [19]

Rose et al.

[11] 4,113,699

[45] Sep. 12, 1978

[54] PRODUCTION OF AROMATIC POLYMERS

[75] Inventors: John Brewster Rose, Letchworth; Philip Anthony Staniland, Tewin Wood, both of England

[73] Assignee: Imperial Chemical Industries Limited, London, England

[21] Appl. No.: 810,355

[22] Filed: Jun. 24, 1977

[30] Foreign Application Priority Data

Jul. 8, 1976 [GB] United Kingdom ............... 28432/76
Feb. 1, 1977 [GB] United Kingdom ................ 4013/77

[51] Int. Cl.² ...................... C08G 65/38; C08G 75/23
[52] U.S. Cl. .................................. 528/126; 528/125; 528/128; 528/175
[58] Field of Search .................... 260/49, 47 R, 50, 61

[56] References Cited

U.S. PATENT DOCUMENTS

| 3,332,909 | 7/1967 | Farnham et al. ....................... 260/47 |
| 3,941,748 | 3/1976 | King ................................. 260/47 R |
| 4,009,149 | 2/1977 | King et al. ............................. 260/45 |
| 4,010,147 | 3/1977 | Rose ................................ 260/79.3 M |
| 4,036,815 | 7/1977 | Feasey et al. ........................... 260/49 |

Primary Examiner—Lester L. Lee
Attorney, Agent, or Firm—Cushamn, Darby & Cushman

[57] ABSTRACT

Aromatic polyetherketones and/or sulphones are produced by heating a halophenol of formula

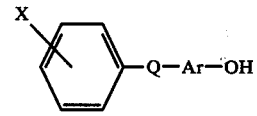

where X = halogen and is ortho or para to Q; Q = —CO— or —SO₂—, Ar = an aromatic radical, with about ½ mole of a granular alkali metal carbonate per mole of halophenol in the presence of N-methyl pyrrolidone, dimethyl sulphone or an aromatic sulphone solvent at 200°–400° C.

9 Claims, No Drawings

PRODUCTION OF AROMATIC POLYMERS

This invention relates to the production of aromatic polymers and in particular to the production of aromatic polyetherketones, polyethersulphones, and copolyetherketone/sulphones.

Such polymers may be prepared by polycondensation of an alkali metal salt of a halophenol in which the halogen atom is activated by a —CO— or —SO$_2$— group ortho or para thereto (such alkali metal salts are hereinafter termed halophenates). To effect polymerisation the halophenate is heated either alone, or in the presence of a diluent that is inert under the reaction conditions employed, to a temperature above 200° C, for example as described in United Kingdom patent Specification 1,153,035. In some cases it is necessary to employ relatively high polymerisation temperatures, e.g. above 250° C, and in some cases above 300° C as the polymers are solid or have too high melt viscosities at lower temperatures to enable the reaction mixture to be stirred. Even in the presence of a solvent, poor solubility of the polymer may dictate the use of such high polymerisation temperatures. At such high temperatures a risk of the production of branched polymers occurs, as a result of side reactions involving the phenate end groups. Thus, as described in Example 3 of United Kingdom patent Specification 1,414,421, polymerisation of the anhydrous potassium salt of 4-(4-chlorobenzoyl)phenol in diphenylsulphone at 300° C gave a polymer of reduced viscosity 1.21 and absorbance 0.37 [RV measured at 25° C, absorbance at a wavelength of 550 nm in a 10 mm cell, both measurements made using a solution of polymer in concentrated sulphuric acid (density 1.84 g.cm$^{-3}$), said solution containing 1 g of polymer per 100 cm$^3$ of solution], which, on compression moulding, gave a brittle film. In comparison, a polymer made by the process of the invention of specification 1,414,421 from the dipotassium salt of 4,4'-dihydroxybenzophenone and 4,4'-difluorobenzophenone in diphenylsulphone at 330° to 340° C gave a polymer of higher molecular weight (RV 1.87) and lower absorbance (0.13) which gave a tough film.

We have now found that, while the use of the halophenate may in some cases be unsatisfactory, good polymers can be obtained by polycondensing the halophenols with an alkali metal carbonate.

The type of process has been proposed in Canadian Patent No. 847,963. We have found that conducting the polycondensation in the absence of a solvent or in the presence of certain solvents gives particularly good polymers.

According to the present invention we provide a process for the manufacture of aromatic polyethersulphones and ketones and copolymers thereof comprising heating at 200° to 400° C at least one halophenol of the formula

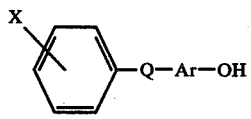

where X is halogen and is ortho or para to Q, Q is —CO— or —SO$_2$—, and Ar is a divalent aromatic radical, with about 0.5 moles of alkali metal carbonate, or about 1 mole of an alkali metal bicarbonate, per mole of halophenol, in the absence of a solvent or in the presence of a solvent selected from N-methyl pyrrolidone, dimethyl sulphone and an aromatic sulphone of formula

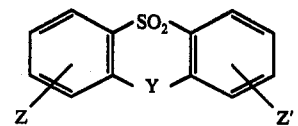

where Y is a direct link, an oxygen atom or two hydrogen atoms (one attached to each benzene ring) and Z and Z', which may be the same or different, are hydrogen atoms or phenyl groups, said alkali metal carbonate or bicarbonate being in granular form of particle size less than 1,000 μm.

Halophenols that may be employed are those having the aforesaid formula

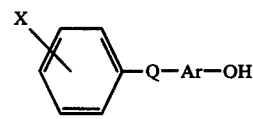

The halogen atom, which is preferably bromine, fluorine or chlorine, particularly flourine or chlorine, is preferably in the para position to the group Q. The fluorophenols are preferred as they generally give polymers of lower absorbances than the corresponding chlorophenols. The aromatic radical Ar is preferably unsubstituted and selected from radicals of formula

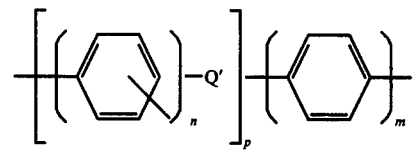

where Q' is —CO— or —SO$_2$—, n and m are 1, 2 or 3 and p is 0, 1, 2 or 3.

Preferred halophenols include
4-(4-chlorophenylsulphonyl)phenol [X = Cl, Q = SO$_2$, Ar = phenyl, i.e., m = 1, p = 0]
4-(4-fluorophenylsulphonyl)phenol [X = F, Q = SO$_2$, Ar = phenyl]
4-(4-fluorobenzoyl)phenol [X = F, Q = CO, Ar = phenyl]
4-(4-chlorobenzoyl)phenol [X = Cl, Q = CO, Ar = phenyl]
4-(4-chlorobenzoyl)-4'-hydroxybiphenyl [X = Cl, Q = CO, Ar = biphenylyl, i.e., m = 2, p = 0]
4-(4-chlorophenylsulphonyl)-4'-(4-hydroxyphenylsulphonyl)biphenyl [X = Cl, Q = SO$_2$, Ar =

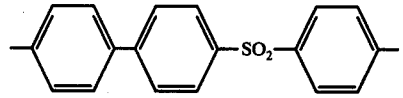

i.e., n = 2, m = 1, p = 1, Q' = SO$_2$]
1-(4-chlorobenzoyl)-4-(4-hydroxybenzoyl)benzene [X = Cl, Q = Q' = CO, n = m = p = 1]
4-(4-chlorobenzoyl)-4'-(4-hydroxybenzoyl)biphenyl [X = Cl, Q = Q' = CO, n = 2, m = p = 1].
Mixtures of such halophenols may be used.

Particularly preferred halophenols and combinations thereof include 4-(4-chlorbenzoyl)phenol and 4-(4-chlorophenylsulphonyl)phenol either alone or in admixture with one another, 4-(4-chlorobenzoyl)phenol in admixture with 4-(4-chlorobenzoyl)-4′-(4-hydroxybenzoyl)biphenyl, and 4-(4-chlorophenylsulphonyl)phenol in admixture with 4-(4-chlorophenylsulphonyl)-4′-(4-hydroxyphenylsulphonyl) biphenyl.

The halophenols may be made, for example, by hydrolysis of the corresponding aromatic carbonates or phosphorochloridates which may be made by the procedure described in our United Kingdom patent Specification 1,357,344.

If desired a small amount, 0.1 to 1.0 mole %, of an aromatic dihalide having the halogen atoms activated by —SO$_2$— or —CO— groups ortho or para thereto may be included to control molecular weight. Examples of such dihalides include 4,4′-dichlorodiphenylsulphone, and 4,4′-bis-(4-chlorophenylsulphonyl)biphenyl.

The alkali metal carbonate or bicarbonate is preferably anhydrous, although any water of hydration will come off without harm during the initial stages of the reaction. Sodium and potassium carbonates and bicarbonates are the preferred alkali metal carbonates and bicarbonates although as the sodium compounds give slower reactions, potassium carbonate is particularly preferred.

The alkali metal carbonate or bicarbonate has only a very slight solubility in the reaction mixture at the polymerisation temperature and hence meters the formation of halophenate from the halophenol. The alkali metal carbonate or bicarbonate should not have too large a particle size as then the reaction rate will be too slow and, indeed, some alkali metal carbonate or bicarbonate may not become available for reaction and hence only polymers of low molecular weight will result.

For this reason the alkali metal carbonate or bicarbonate should have a particle size of less than 1000 μm. A particularly convenient way of obtaining the alkali metal carbonate or bicarbonate in the correct physical size is simply sieving unduly large particles out of a commercial sample of the carbonate or bicarbonate.

The amount of alkali metal carbonate employed is about ½ mole per mole of halophenol (or 1 mole of bicarbonate per mole of halophenol). The use of lesser amounts will result in the presence of unreacted halophenol which will lead to polymers of low molecular weight. On the other hand a substantial excess of carbonate or bicarbonate is undesirable as the carbonate or bicarbonate may react with the polymer at elevated temperatures giving rise to cleavage of the polymer resulting in branching and/or low molecular weight products.

The amount of alkali metal carbonate should therefore be between 0.5 and 0.55 moles per mole of halophenol. Where a bicarbonate is used it should be present in an amount of between 1 and 1.1 moles per mole of halophenol.

Where a polymerisation solvent is used it should be selected from N-methyl pyrrolidone, dimethyl sulphone and aromatic sulphones of the formula

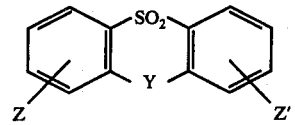

where Y, Z and Z′ are as hereinbefore defined. Examples of such aromatic sulphones include diphenylsulphone, dibenzothiophen dioxide, phenoxathiin dioxide and 4-phenylsulphonyl biphenyl. Diphenylsulphone is the preferred aromatic sulphone solvent.

The polymerisation temperature employed will depend on the nature of the reactants and the solvent (if any) employed. Where no solvent is employed, the polymerisation temperature should be sufficiently high to maintain molten the halophenol and the polymer produced therefrom. For the production of some polymers, it may be desirable to commence polymerisation at a temperature in the lower part of the range, e.g. between 200° and 250° C, and to increase the temperature as polymerisation ensues. This is particularly necessary when making polymers having only a low solubility in the solvent. Thus, there it is desirable to increase the temperature progressively to maintain the polymer in solution as its molecular weight increases. Equally, where no solvent is employed the temperature may need to be increased to keep the polymer formed from the halophenol molten. Generally when no solvent is employed, polymerisation temperatures in excess of 250° C are required.

Where the polymerisation is conducted in the melt in the absence of a solvent, the reaction mixture becomes very viscous as polymerisation proceeds. For this reason at least the latter part of such polymerisations is preferably carried out in an extruder. Alternatively the polymerisation may be commenced in the absence of a solvent and then one of the specified solvents added during the course of polymerisation.

After polymerisation has proceeded to the desired extent the reaction mixture is cooled and the polymer isolated by techniques well known in the art, e.g. milling the cooled, solidified, reaction mixture and then leaching out the alkali metal halide reaction byproduct and solvent (if any) using a suitable leaching solvent or solvents.

Prior to cooling, the polymerisation may be endstopped, if desired, by addition of an end stopping reagent, e.g. a mono or polyfunctional halide such as methyl chloride, t-butyl chloride or 4,4′-dichlorodiphenylsulphone.

Polyetherketones and polyethersulphones, and copolymers thereof, made by the process of the present invention are particularly useful in applications where they are liable to be subject to high service temperatures. Examples of such uses include electrical insulation, coatings on cookware, etc.

The invention is illustrated by the following Examples.

EXAMPLE 1

4-(4-fluorobenzoyl)phenol (19.4592 g, 0.09 mole), 4-(4-fluorophenylsulphonyl)phenol (2.5204 g, 0.01 mole), 4,4′-dichlorodiphenylsulphone (0.1440 g, 0.0005 mole), potassium carbonate (6.9706 g, 0.505 mole commercial sample sieved through a 300 μm sieve and diphenylsulphone (30 g) were placed in a 3-necked flask (capacity 250 cm³) equipped with a nitrogen inlet, stirrer, and air condenser. The flask was heated on a metal bath at 230° C for 1 hour and then the temperature raised to 280° C for 1 hour, and finally raised to 320° C for 1 hour. The product was cooled, milled to a particle size of less than 850 μm, washed successively with water and acetone, and then dried.

The polymer had a reduced viscosity of 1.24 (in $H_2SO_4$) and an absorbance of 0.06.

The polymer was compression moulded at 400° C and slowly cooled to give a tough, white, crystalline film.

EXAMPLE 2

4-(4-chlorobenzoyl)phenol (20.9403 g, 0.090 mole), 4-(4-chlorophenylsulphonyl)phenol (2.6850 g, 0.010 mole), 4,4'-dichlorodiphenylsulphone (0.2872 g, 0.001 mole), potassium carbonate (6.9796 g, 0.505 mole commercial sample sieved through 300 μm sieve) and diphenylsulphone (30 g) were treated as in Example 1 except that the period of 320° C was 3 hours. The polymer had a reduced viscosity of 2.61 (in $H_2SO_4$) and an absorbance of 0.21. The polymer gave a tough crystalline film that was greyer than that obtained in Example 1.

EXAMPLE 3

Example 1 was repeated but using N-methyl pyrrolidone (120 ml) in place of diphenylsulphone and using a polymerisation temperature of 200° C. After 1 hour polymer had crystallised out and had a reduced viscosity of 0.35.

After a total of 3½ hours polymerisation time the polymer was isolated by pouring the slurry into water, filtering, washing and drying the precipitate. The polymer had a reduced viscosity of 0.65 and an absorbance of 0.22.

EXAMPLE 4

4-(4-chlorophenylsulphonyl)phenol (26.850 g, 0.10 mole) potassium carbonate (6.9796 g, 0.0505 mole commercial sample sieved through 300 μm sieve) and diphenylsulphone (400.0 g) were stirred and heated under a slow stream of nitrogen at 230° C for 20 minutes and then at 280° C for 2 hours 40 minutes. Samples were withdrawn at intervals for RV measurement as follows

| Sample | Time hours | RV |
|---|---|---|
| 1 | .75 | 0.27 |
| 2 | 1.00 | 0.38 |
| 3 | 1.50 | 0.73 |
| 4 | 2.00 | 0.92 |
| 5 | 3.00 | 0.99 |

In this Example RV's were measured at 25° C on a solution of the polymer in dimethyl formamide, said solution containing 1 g of polymer per 100 cm³ of solution.

It was found that a useful RV (0.38) was obtained in a total reaction time of only 1 hour and a high RV (0.73) after only 1½ hours.

Example 14 of Canadian Patent No. 847,963 indicates that a reaction time of 6 hours was necessary to obtain a reasonably high RV.

EXAMPLE 5

4-(4-chlorophenylsulphonyl)phenol (15 g, 0.0558 moles) and anhydrous potassium carbonate (3.63 g, 0.0263 moles) were charged to a 3-necked flask (capacity 100 cm³) fitted with a stirrer, air condenser and nitrogen inlet.

The mixture was heated on an oil bath. When the temperature reached 175° C frothing began, and 10 minutes later, when the temperature had reached 200° C, the frothing had subsided. The temperature was increased to 250° C and maintained for 1 hour after which the mixture was pale yellow and becoming viscous. The temperature was raised to 260° C and maintained for 1¼ hours after which the mixture was a solid yellow powder. The temperature was raised to 288° to 290° C whereat the mixture melted to give a pale viscous melt. It was maintained at this temperature for 1 hour after which the product was cooled. The polymer was separated by dissolution in dimethyl formamide.

The polymer had a reduced viscosity of 0.1, measured at 25° C on a solution in dimethyl formamide containing 1 g of polymer per 100 cm³ of solution.

We claim:

1. A process for the manufacture of aromatic polyethersulphones and ketones and copolymers thereof comprising heating at 200 to 400° C at least one halophenol of the formula

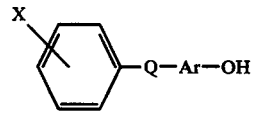

where X is halogen and is ortho or para to Q, Q is —CO— or —$SO_2$—, and Ar is a divalent aromatic radical, with about 0.5 moles of alkali metal carbonate, or about 1 mole of an alkali metal bicarbonate, per mole of halophenol, in the presence of a solvent selected from N-methyl pyrrolidone, dimethyl sulphone and an aromatic sulphone of formula

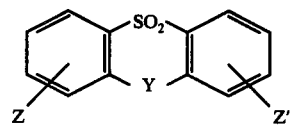

where Y is a direct link, an oxygen atom or two hydrogen atoms (one attached to each benzene ring) and Z and Z', which may be the same or different, are hydrogen atoms or phenyl groups, said alkali metal carbonate or bicarbonate being in granular form of particle size less than 1000 μm.

2. A process according to claim 1 wherein the halogen atom X in the halophenol is selected from the group consisting of fluorine and chlorine.

3. A process according to claim 1 wherein the aromatic radical Ar in the halophenol is selected from radicals of formula

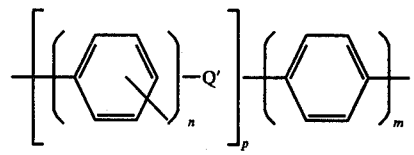

where Q' is —CO— or —$SO_2$—, $n$ and $m$ are 1, 2 or 3 and $p$ is 0, 1, 2 or 3.

4. A process according to claim 3 wherein the at least one halophenol is selected from the group consisting of 4-(4-chlorobenzoyl)phenol, 4-(4-chlorophenylsulphonyl) phenol, mixtures of 4-(4-chlorobenzoyl)phenol with 4-(4-chlorophenylsulphonyl)phenol or 4-(4-chlorobenzoyl)-4'-(4-hydroxybenzoyl)biphenyl, and mixtures of 4-(4-chlorophenylsulphonyl)phenol with 4-(4-chlorophenylsulphonyl) 4'-(4-hydroxyphenylsulphonyl)biphenyl.

5. A process according to claim 1 wherein 0.1 to 1.0 mole % of an aromatic dihalide having the halogen atoms activated by —$SO_2$— or —CO— groups ortho or para thereto is included in the reaction mixture.

6. A process according to claim 5 wherein the aromatic dihalide is selected from the group consisting of 4,4'-dichlorodiphenylsulphone, and 4,4'-bis-(4-chlorophenylsulphonyl)biphenyl.

7. A process according to claim 1 wherein the alkali metal carbonate or bicarbonate is potassium carbonate.

8. A process according to claim 1 wherein the amount of alkali metal carbonate or bicarbonate is between 0.5 to 0.55 moles of carbonate, or 1 to 1.1 moles of bicarbonate, per mole of halophenol.

9. A process according to claim 1 wherein the halophenol is heated in the presence of diphenyl sulphone as solvent.

* * * * *